United States Patent
Doyle et al.

[11] 3,902,044
[45] Aug. 26, 1975

[54] ELECTRICALLY HEATED TOWEL STEAMING APPLIANCE

[75] Inventors: Edward J. Doyle, Hatboro; Robert S. Waters, Lancaster, both of Pa.

[73] Assignee: Schick Incorporated, Lancaster, Pa.

[22] Filed: Mar. 18, 1974

[21] Appl. No.: 452,206

Related U.S. Application Data

[63] Continuation of Ser. No. 307,850, Nov. 20, 1972, abandoned.

[52] U.S. Cl. .................. 219/284; 21/81; 21/95; 99/440; 126/369; 219/275; 219/289; 219/401
[51] Int. Cl.² .................. H05B 1/00; A61L 3/00
[58] Field of Search .............. 219/401, 271–276, 219/284–296, 439; 21/81, 85, 92, 94, 95, 97; 126/369, 20; 99/440, 416, 417

[56] References Cited
UNITED STATES PATENTS

| | | | |
|---|---|---|---|
| 437,706 | 10/1890 | Mathias | 99/440 |
| 2,061,837 | 11/1936 | Hanks et al. | 219/275 |
| 2,138,908 | 12/1938 | Douthitt | 219/401 UX |
| 2,443,321 | 6/1948 | Miner | 21/81 UX |
| 3,119,925 | 1/1964 | Shomock | 219/288 |
| 3,222,499 | 12/1965 | Conlin et al. | 219/289 |
| 3,347,618 | 10/1967 | McKeown | 219/439 X |
| 3,364,844 | 1/1968 | Felske | 126/369 X |
| 3,493,723 | 2/1970 | Popeil | 219/275 X |
| 3,505,007 | 4/1970 | Green | 21/95 X |

FOREIGN PATENTS OR APPLICATIONS

| | | | |
|---|---|---|---|
| 968,588 | 4/1950 | France | 21/95 |

*Primary Examiner*—A. Bartis

[57] ABSTRACT

A portable appliance for steamheating towels includes a base having side walls, a bottom and a perforated tray extending between the side walls above the bottom. A removable cover having side walls and a top cooperates with the base to form a steam chest. An electrically heated steam generating means is located in the base below the perforated tray. A plurality of fasteners are provided on the inside of the cover top for suspending towels to be heated inside the steam chest above the tray when the cover is on the base and for supporting the towels in an orderly arrangement for distribution when the cover is removed and inverted. A pedestal handle having a flat surface is centrally mounted on the outside of the cover top for supporting the cover in spaced relationship to a supporting surface when inverted. The top of the cover is provided with an aperture remote from the handle for relieving steam pressure in the chest when the cover is on the base. The aperture includes a standpip to raise the inside terminus of the aperture so as to prevent condensate from escaping through the aperture when the cover is removed and invested.

3 Claims, 8 Drawing Figures

PATENTED AUG 26 1975 3,902,044

ELECTRICALLY HEATED TOWEL STEAMING APPLIANCE

This is a continuation of application Ser. No. 307,850 filed Nov. 20, 1972, now abandoned.

BACKGROUND OF THE INVENTION

The present invention relates in general to steam heating appliances, and more particularly to a steam heating appliance for towels which is particularly well adapted for home use.

Although at one time the furnishing of hot steamed towels was a service found only at luxury hotels and resorts, the practice has in recent years found increasing acceptance in private homes as a refreshing climax to an enjoyable dinner or evening party. Unfortunately, however, no practical appliance has heretofore existed for conveniently heating and serving towels in the home. Existing appliances used for this purpose have either been intended for use in restaurants and hotels, and have therefore been undesirably large and expensive; or have been appliances intended for some other purpose; and therefore have not provided optimum performance.

Another problem with prior-art towel heating appliances has been the necessity of transferring the towels from the appliance one at a time to a tray or other suitable serving container. This has been at best a time consuming process requiring the manipulation of tongs to avoid being burned by the hot towels.

Accordingly, it is a general object of the present invention to provide a new and improved appliance for steam heating articles such as towels.

It is a more specific object of the present invention to provide a steam heating appliance for towels or the like which is smaller in size and more convenient to use.

It is a still more specific object of the present invention to provide a hot towel steaming appliance which does not require that the heated towels be removed one at a time prior to serving.

It is another more specific object of the present invention to provide a hot towel appliance which also provides a convenient means for serving the heated towels.

SUMMARY OF THE INVENTION

The invention is directed to an article heating appliance which comprises, in combination, a base having side walls and a bottom, and a cover for the base having side walls and a top, the cover being adapted to form, in conjunction with the base, a steam chest. The appliance further comprises steam generating means within the steam chest for generating a steam atmosphere therein, and fastening means on the inside top surface of the cover for suspending the articles in the steam atmosphere in an ordered arrangement when the cover is removed and inverted.

The invention is further directed to an appliance for steam-heating towels which comprises, in combination, a base having side walls and a bottom, and a cover for the base having side walls and a top, the cover being adapted to form, in conjunction with the base, a steam chest. The appliance further comprises steam generating means within the steam chest for generating a steam atmosphere therein, and means comprising a plurality of fasteners projection from the inside surface of the cover for suspending the towels in the steam atmosphere when the cover is closed, and for supporting the towels in an ordered arrangement for distribution when the cover is removed and inverted.

BRIEF DESCRIPTION OF THE DRAWINGS

The features of the present invention, which are believed to be novel, are set forth with particularly in the appended claims. The invention, together with the further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
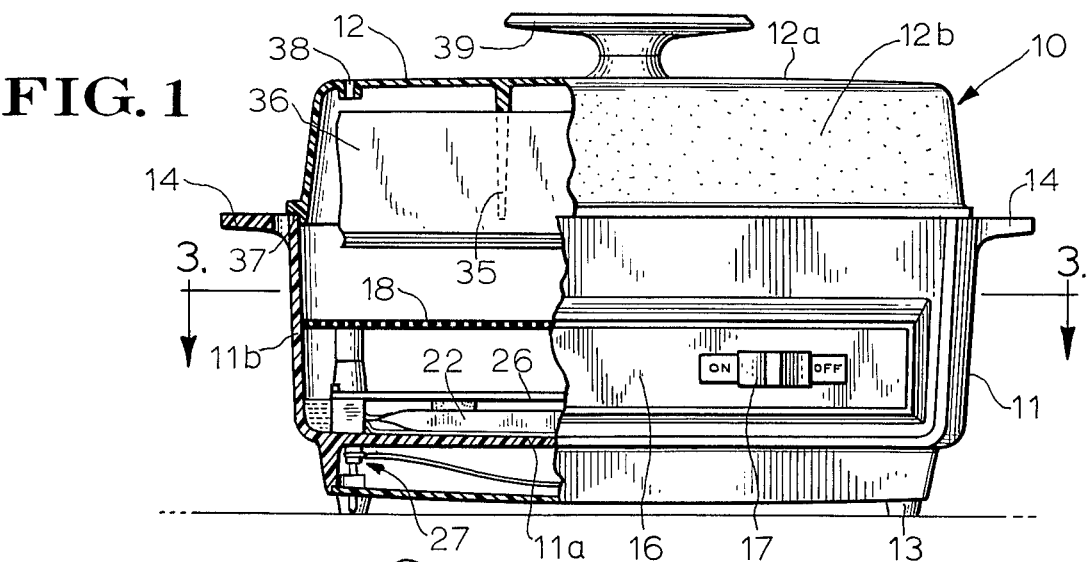
FIG. 1 is an elevational front view, partially in cross-section, of a towel heating appliance constructed in accordance with the invention.
Figure 2:
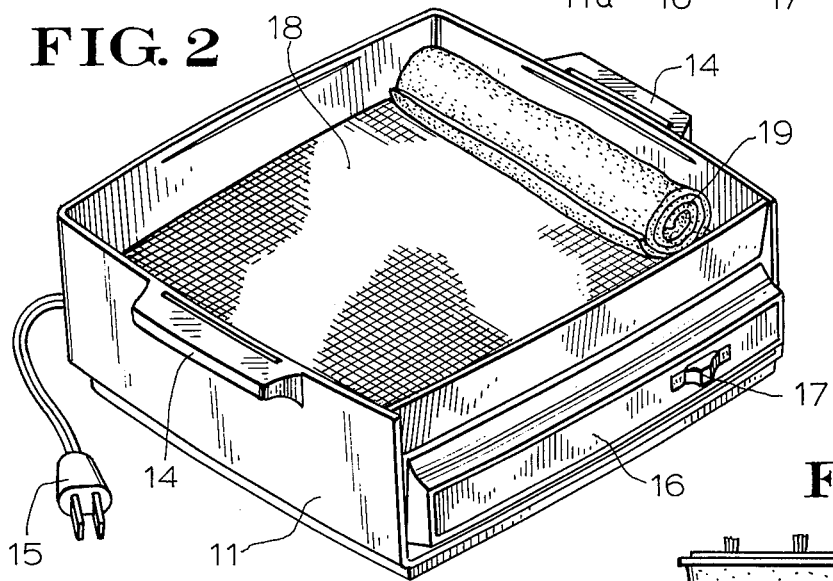
FIG. 2 is a perspective view of the base portion of the towel heating appliance of FIG. 1.

Referring to FIGS. 1 and 2, a towel heating appliance 10 embodying the present invention comprises a base 11 of generally square dimensions and a removable cover 12. To promote uniform cooling of the base and to prevent unadvertent marring of a supporting surface, the base includes four corner-mounted feet 13 of rubber or other resilient material. A handle 14 is provided at either end of the base fo facilitate carrying the appliance, and a power cord 15 is provided for supplying operating current to the appliance. A name plate 16 may be provided on one side of the base for product identification purposes, and an ON-OFF power switch 17 may be incorporated therewith for operator convenience.

Basically, the base 11 comprises a bottom 11a of generally square dimensions joined to four upstanding wall sections 11b of high-temperature high-impact plastic or equivalent material. A perforated tray 18 may be suspended from flanges molded into the walls of the base to support a cloth towel roll 19, or other items which may be positioned thereon for steam heating. The perforated tray is secured at each corner by means of threaded screws 20 which engage complimentarily threaded holes in tray mounting bosses molded into the walls of the base.

Figure 3:
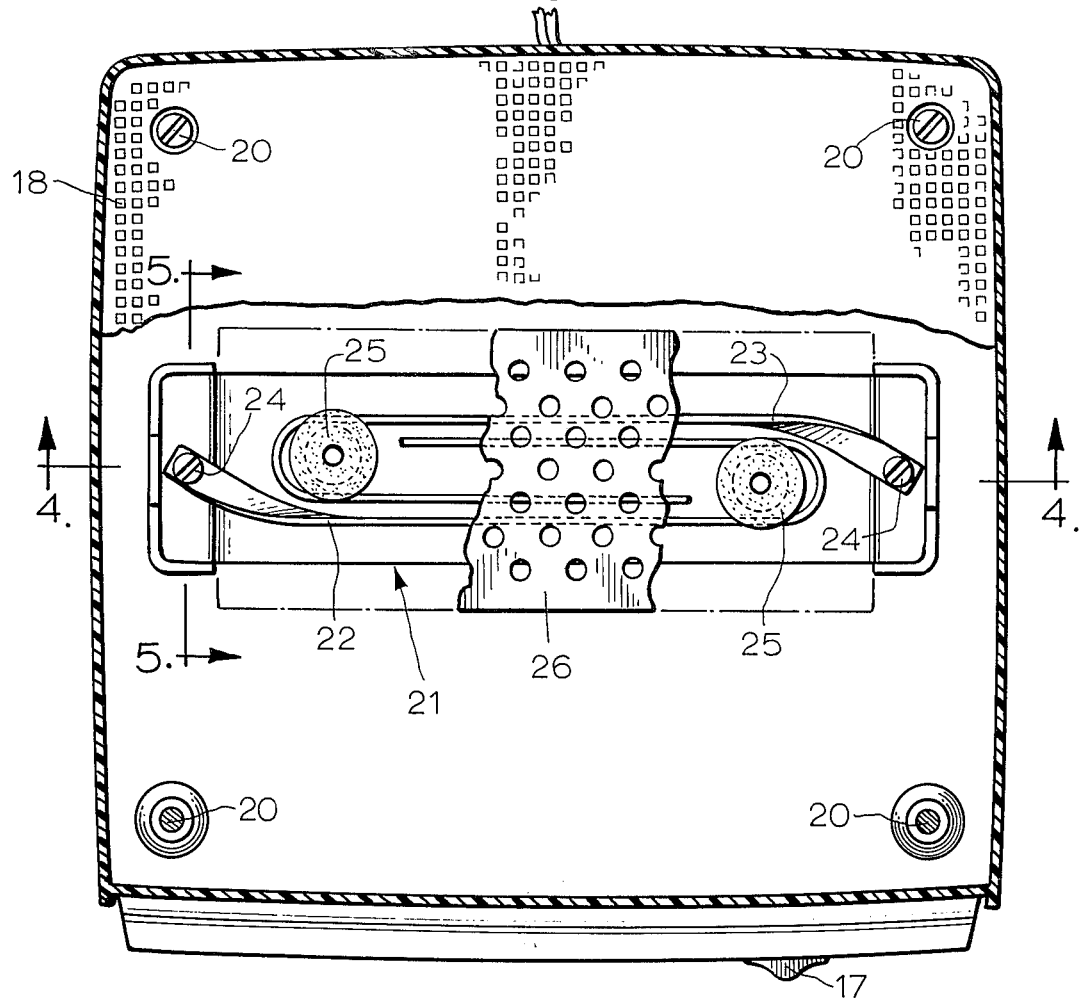
FIG. 3 is a top view, partially fragmentary, of the base portion of the towel heating appliance shown in FIG. 2.
Figure 4:
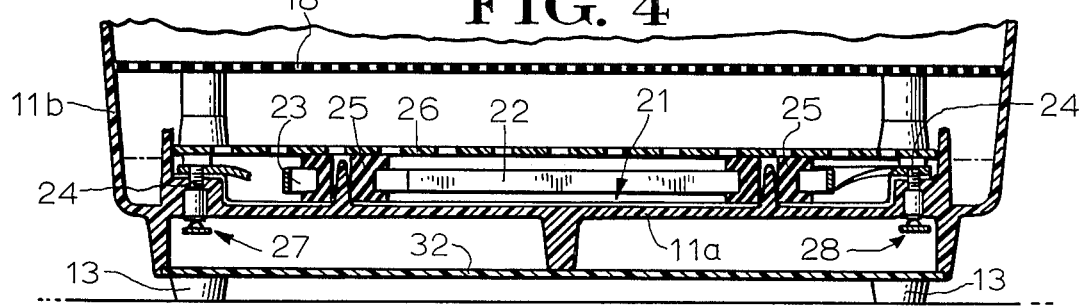
FIG. 4 is a cross-sectional view of the base portion of the towel heating appliance taken along lines 4—4 of FIG. 3.

Referring to FIGS. 3 and 4, a steam well 21 of generally rectangular dimensions is molded into the bottom of the base for the purpose of storing water to be turned into steam. In practice the base is filled with water to a level just sufficient to fill the steam well, and to insure that excess water is not added an apertured upstanding boss (not shown) may be molded into the bottom of the base to drain off excess water, and a measuring cup may be provided to the user to prevent overfilling.

To heat the water in the steam well to its boiling point, steam generating means in the form of a pair of U-shaped heating electrodes 22 and 23 are disposed edgewise within the well in interlocking fashion, one leg of each extending between the legs of the other. One end of each electrode is twisted to provide a flat contact surface, which is secured to the bottom of the base by a machine screw 24 or other appropriate fastening means. The two electrodes are held in positive alignment by a pair of spool-shaped spacers 25 which are fastened to the bottom to prevent the electrodes from shorting or otherwise shifting in position during use.

The U-shaped heating electrodes operate on the principle that a pair of oppositely polarized electrodes when positioned in tap water cause sufficient current flow through the water to heat the water to its boiling point, the current flow between the electrodes being dependent on the applied voltage on the spacing of the electrodes, and on the mineral content of the water. Ordinary tap water normally has sufficient mineral content for this purpose when 120 volt AC line current is applied to relatively closely spaced electrodes.

The aforedescribed arrangement of electrodes for heating the water, while well known to the art and providing satisfactory performance, necessitates that several safety precautions be taken in the construction of the appliance. One such precaution is the provision of a perforated shield 26 over steam well 21. This shield tends to prevent water within the steam well, which may bubble as a result of the heating action of the electrodes, from spraying out into the interior of base 11. Such discharges could otherwise establish an electrically conductive path between the electrodes and areas assessible to the hand of the user, which could result in an electric shock should the user simultaneously touch a grounded object such as a water pipe.

Figure 5:
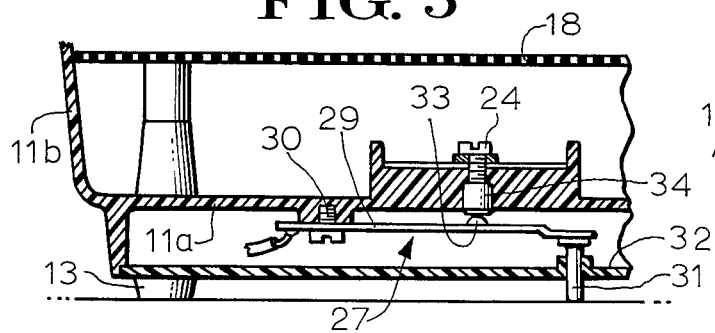
FIG. 5 is a cross-sectional view of the base portion of the towel heating appliance taken along lines 5—5 of FIG. 3.

Another safety precaution incorporated in the present embodiment is the provision of a pair of safety switches 27 and 28 in series with the AC line. As shown in FIG. 5, these safety switches comprise a resilient leaf contact 29 having an anchored end and a movable contact end. The anchored ends are secured by means of threaded screws 30 to a ledge molded into the bottom of base 11, and the contact ends are abutted against actuator buttons 31 which are held in position by apertures in a bottom plate 32 fitted onto base 11. Each of the leaf contacts contains a boss 33 near its contact end which is aligned with a respective of contacts 34, which are threaded onto the ends of machine screws 24.

Figure 6:
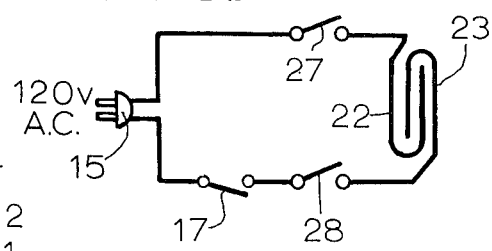
FIG. 6 is a schematic diagram of the electrical circuit of the towel heating appliance of FIG. 1.

The safety switches are biased open except when base 11 is resting on a support surface and actuator buttons 31 are depressed by the surface to urge contacts 33 into engagement with contacts 34. This prevents a possible shock hazard by disconnecting the AC line should the towel heating appliance be inadvertently tipped or tilted so as to spill the water in steam well 21 over the top of the perforated tray 18. With the present embodiment th this happening will open both of the safety switches, thus disconnecting both sides of the AC line from the heating electrodes, as shown by the schematic diagram of FIG. 6.

Figure 7:
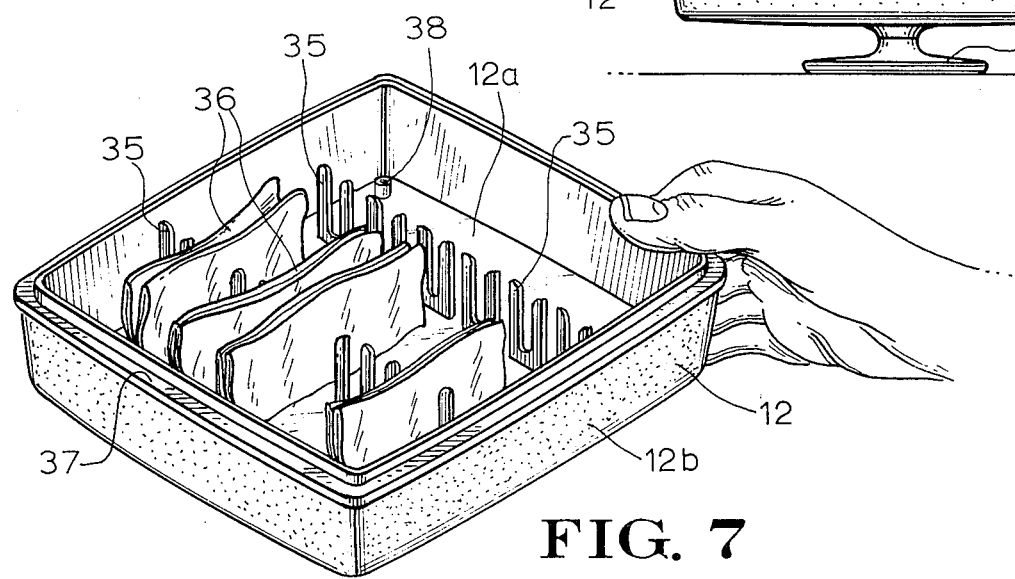
FIG. 7 is a perspective view of the cover portion of the towel heating appliance of FIG. 1.

Referring now to FIG. 7, the cover 12 of towel heating appliance 10 is seen to comprise, like base 11, a top plate 12a of generally square dimensions, and four upstanding wall sections 12b of high-temperature high-impact plastic or equivalent material. In accordance with the invention fastening means in the form of a plurality of projecting fasteners 35 are provided on the inside surface of the top plate 12a of the cover. In the present embodiment the fasteners each have a pair of spaced-apart resilient fingers for grasping an article to be heated. However, it will be appreciated that the fasteners may take other forms depending on the nature of the article, and that the clothespin-like structure shown is particularly well adapted to hold a folded towel 36 in upstanding relationship to the top plate 12a of the cover. Then, when the cover is set on base 11, as shown in FIG. 1, a steam chest is formed and steam generated within the base freely communicates with the folded towels to thoroughly heat and moisten them. A steam-tight seal is assured between base 11 and cover 12 by provision of an inset flange 37 about the periphery of the cover. An aperture 38 is provided in one corner of cover 12 to relieve steam pressure which would otherwise develop within the steam chest. As shown in FIG. 1, an abutment or shoulder molded into the inside surface of the top plate 12a of cover 12 about the periphery of this aperture forms a standpipe which prevents condensate from running out through the aperture when the cover is inverted for serving.

The projecting fasteners 35 provided in cover 12, besides providing improved heating of towels secured therein, also provide, in accordance with another aspect of the invention, a convenient and efficient serving means for distributing heated towels when removed from the appliance. Specifically, and as shown in FIG. 3, when cover 12 is removed from the base and inverted, the towels are neatly aligned and immediately available for distribution. The tray can be easily carried in one hand in its inverted position, and the ordered upstanding posture of the individual towels makes the towels easy to remove from the fasteners 35. Thus, it is not necessary with the present embodiment to remove the heated towels one by one from the appliance, and arrange them on a serving tray. All that the user need do is to lift and invert the tray.

Figure 8:
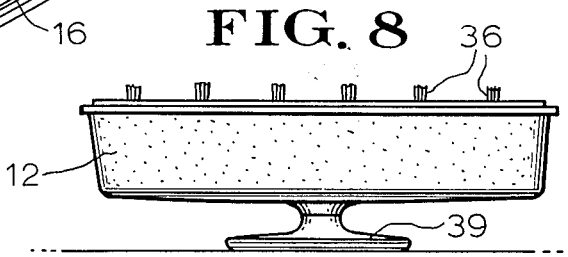
FIG. 8 is a side elevational view of the cover portion of the towel heating appliance setting on a flat surface.

The cover 12 of the present embodiment is also provided with a center-mounted handle member 39. In accordance with another aspect of the invention the handle of the cover, in addition to aiding in the removal of the cover from base 11, also provides a means for supporting the cover in spaced relationship to a supporting surface when it is being used inverted as a distribution tray. While the handle may take many different forms in accomplishing this purpose, and may consist of more than one member, the pedestal-shaped handle form shown, with its enlarged flat top face, provides an esthetically pleasing handle which provides good stability when positioned on a flat surface, as shown in FIG. 8. The handle may be internally weighted to further improve the stability of the cover, if desired.

Thus, a steam heating appliance has been shown and described which provides, by way of the novel construction of its cover, an improved and more efficient heating and moistening of towels, as well as an improved and more convenient means for distributing the towels. The appliance of the invention obviates the previously required step of removing the towels one by one from the appliance, and arranging the towels on a serving tray for distribution. The appliance accommodates all types of reusable and disposable hand towels, those too bulky for the cover being rolled up and positioned in a conventional manner on perforated tray 18. Furthermore, the invention attains the above features at minimal additional expense and without in any way compromising with the safety features of the appliance.

It will be appreciated that the appliance may assume other forms within the scope of the invention. For example, instead of the square base and cover shown the appliance may have a round base and cover, and instead of the electrode type heating elements the invention may be employed in a heater having conventional resistance elements. Furthermore, the fasteners fingers integrally molded into the cover, as shown in the present embodiment.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. An appliance for heating and serving towels, comprising, in combination:
    a base having a bottom plate, a plurality of side walls extending upwardly from said bottom plate, and a perforated tray extending between said side walls above said bottom plate;
    a cover for said base having a top plate and a plurality of side walls extending downwardly from said top plate into engagement with respective ones of said upwardly extending side walls from said bottom plate, said cover being removably received on said base and defining when received thereon a steam chest;
    steam generating means within said base between said bottom plate and said perforated tray for producing a steam atmosphere within said steam chest;
    means comprising a handle disposed substantially centrally on the outside surface of the top plate of said cover, said handle having a planar top surface for supporting said cover when inverted such that said top plate is spaced from an underlying supporting surface;
    means comprising a plurality of fasteners integrally molded into said top plate and projecting from the inside surface of said cover into said steam chest for suspending a plurality of towels in said steam atmosphere when said cover is closed, and for supporting said towels in an ordered arrangement when said cover is removed and inverted for serving;
    means comprising at least one aperture through said top plate at a location remote from said handle for relieving pressure within said steam chest when said cover is closed; and
    means on the inside surface of said top plate comprising a standpipe communicating with said at least one aperture for raising the inside terminus of said aperture above the inside surface of said top plate to prevent condensate on said inside surface from escaping through the aperture when said cover is removed and inverted.

2. An appliance for heating and serving towels as defined in claim 1 wherein said means for supporting said cover during serving comprise a single pedestal-shaped handle centrally disposed on the outside surface of said top plate.

3. An appliance for heating and serving towels as defined in claim 1 wherein a portion of said towels are in folded form and a portion of said towels are in rolled form, wherein said perforated tray extending between said side walls of said base is adapted to receive said towels in rolled form, and wherein said resilient fasteners projecting from the inside surface of said cover are adapted to receive said towels in folded form.

* * * * *